United States Patent [19]

Keil

[11] 3,725,877

[45] Apr. 3, 1973

[54] SELF CONTAINED MEMORY KEYBOARD

[75] Inventor: Ronald B. Keil, Warren, Mich.

[73] Assignee: General Motors Corporation, Detroit, Mich.

[22] Filed: Apr. 27, 1972

[21] Appl. No.: 248,290

[52] U.S. Cl. ................340/172.5, 340/365, 235/153

[51] Int. Cl. ............................G06f 3/02, G06f 11/06

[58] Field of Search ............340/172.5, 365; 235/153

[56] References Cited

UNITED STATES PATENTS

| | | | |
|---|---|---|---|
| 3,248,700 | 4/2966 | Sinn | 340/365 X |
| 3,312,953 | 4/1967 | Wang et al. | 340/172.5 |
| 3,372,379 | 5/1968 | Collom et al. | 340/172.5 |
| 3,389,381 | 6/1968 | Foster et al. | 340/172.5 |
| 3,465,296 | 9/1969 | Drage et al. | 340/172.5 |
| 3,541,519 | 11/1970 | Thompson | 340/172.5 |
| 3,541,527 | 11/1970 | Rhodes | 340/172.5 |
| 3,553,445 | 1/1971 | Hernandez | 235/156 |
| 3,575,589 | 4/1971 | Neema | 235/153 |
| 3,576,433 | 4/1971 | Lee et al. | 235/153 |
| 3,623,082 | 11/1971 | Stein et al. | 340/365 |

*Primary Examiner*—Paul J. Henon
*Assistant Examiner*—Jan E. Rhoads
*Attorney*—Eugene W. Christen et al.

[57] ABSTRACT

A keyboard unit is disclosed for temporarily storing information for subsequent transfer to a computer. The unit includes a plurality of pushbuttons interconnected with a two-digit display through encoding and decoding circuitry, for operator verification of data entered and further includes a shift register memory for temporarily storing the data entered. The shift register memory is programmed by a counter so that the data is sequentially stored in the individual shift registers. The shift registers are operable in either a parallel input or serial output mode under the control of a flip-flop which responds to connection and disconnection of the memory keyboard with a computer. During the temporary storing of data the shift registers operate in a parallel mode. When the keyboard memory is connected with a computer the shift registers are switched to their serial output mode and the data is transmitted to the computer under computer control. A code word is stored in one of the memory shift registers to permit identification of the keyboard memory unit from which the data is being received. In the serial transmission of data to the computer a wrap-around circuit is provided which permits redundant transmission of data for verification by the computer.

3 Claims, 6 Drawing Figures

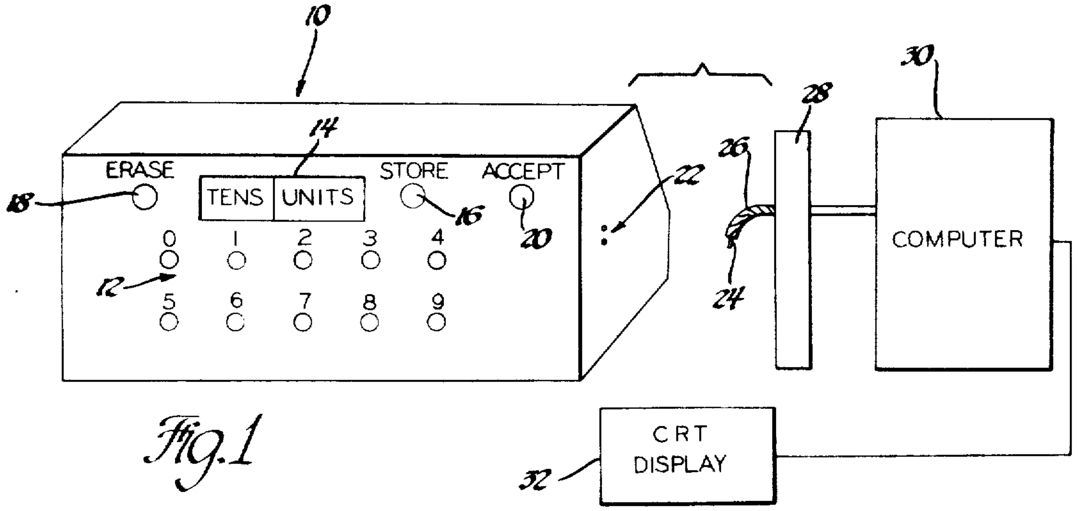
Fig.1
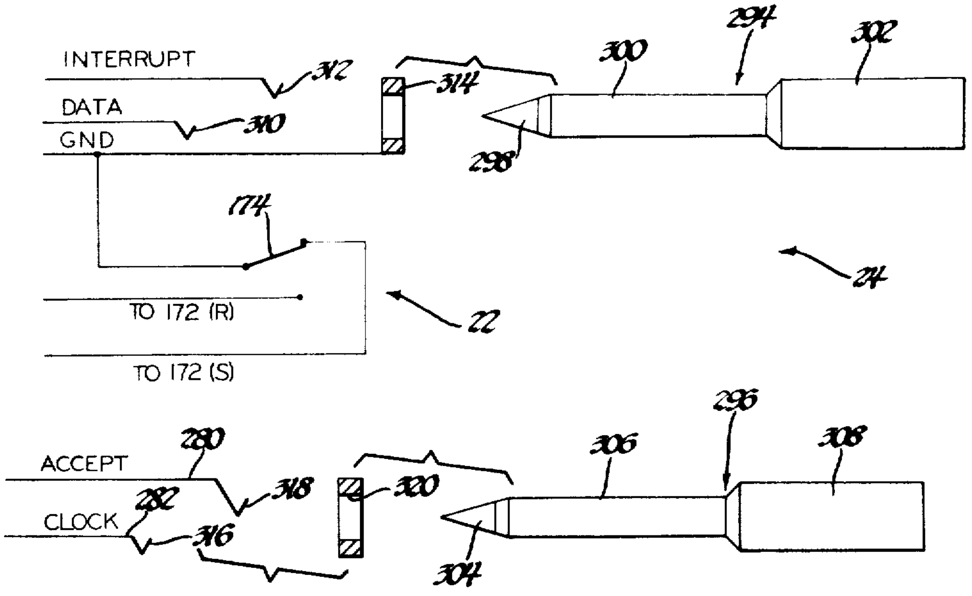
Fig.2
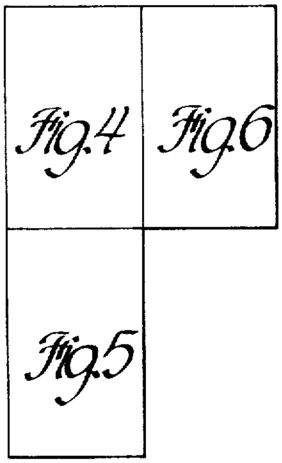
Fig.4 Fig.6
Fig.3 Fig.5

SELF CONTAINED MEMORY KEYBOARD

BACKGROUND OF THE INVENTION

This invention relates to data storage devices and more particularly to a portable battery operated keyboard provided with a self-contained memory for temporarily storing data for subsequent transfer to a computer at convenient intervals.

There is a need in modern assembly plants for quickly, inexpensively, and accurately providing foremen with quality information regarding products being manufactured and assembled in the plant. Presently, quality information is gathered by on-line inspectors by means of check lists or inspection cards. The unavoidable delay in compiling and sorting this information prevents immediate identification of the assembly area from which the information originates.

With the foregoing in mind it is an object of the present invention to provide a portable electronic device for use in gathering and temporarily storing information for transmission at a subsequent time to data processing equipment.

It is another object of the present invention to provide a portable, battery operated, electronic keyboard having a self-contained memory for temporarily storing information gathered by on-line inspectors in assembly plants.

SUMMARY OF THE INVENTION

In accordance with the present invention information gathered by on-line inspectors is entered into a portable keyboard unit by depressing one or more pushbuttons which correspond to a numeric code (0–99) for a particular item of information. Encoding and decoding circuitry interconnect the pushbuttons with a display which displays the numeric code entered. The display remains energized for as long as a pushbutton is depressed. If the visual feedback from the display indicates that an erroneous code has been entered, the operator may depress an ERASE pushbutton provided on the unit and thereafter enter the proper code. If the operator is satisfied with the code displayed he may depress a STORE pushbutton which stores the coded information in a memory contained in the unit. Each time a coded item is stored into memory, a memory control increments to address the next sequential memory location. The memory consists of nine parallel-in serial-out shift registers, one of which is not accessible to the operator but stores an identification number associated with the particular keyboard unit. The mode of shift register memory operation is switched from parallel-in to serial-out upon connection of the unit with a computer terminal and under computer control the data is shifted serially to the computer. After the computer has inspected the data an ACCEPT light on the unit is energized to signal the operator that the data has been transmitted and is acceptable and the unit may be disconnected from the computer terminal. An output device such as a CRT display located in the foreman's area and connected with the computer provides the foreman with up-to-date information being gathered by the inspector.

BRIEF DESCRIPTION OF THE DRAWINGS

A more complete understanding of the present invention may be had from the following detailed description which should be taken in conjunction with the drawings in which:

FIG. 1 is a perspective view of the memory keyboard unit of the present invention and further discloses the system application of the invention;

FIG. 2 shows in detail the phone plug and phone jack for interconnection of the keyboard unit with a computer;

FIG. 3 is a block diagram showing the arrangement of FIGS. 4, 5, and 6. When arranged as shown in FIG. 3, FIGS. 4, 5, and 6 are a detailed schematic diagram of the memory keyboard unit.

DETAILED DESCRIPTION OF THE INVENTION

Figure 4:
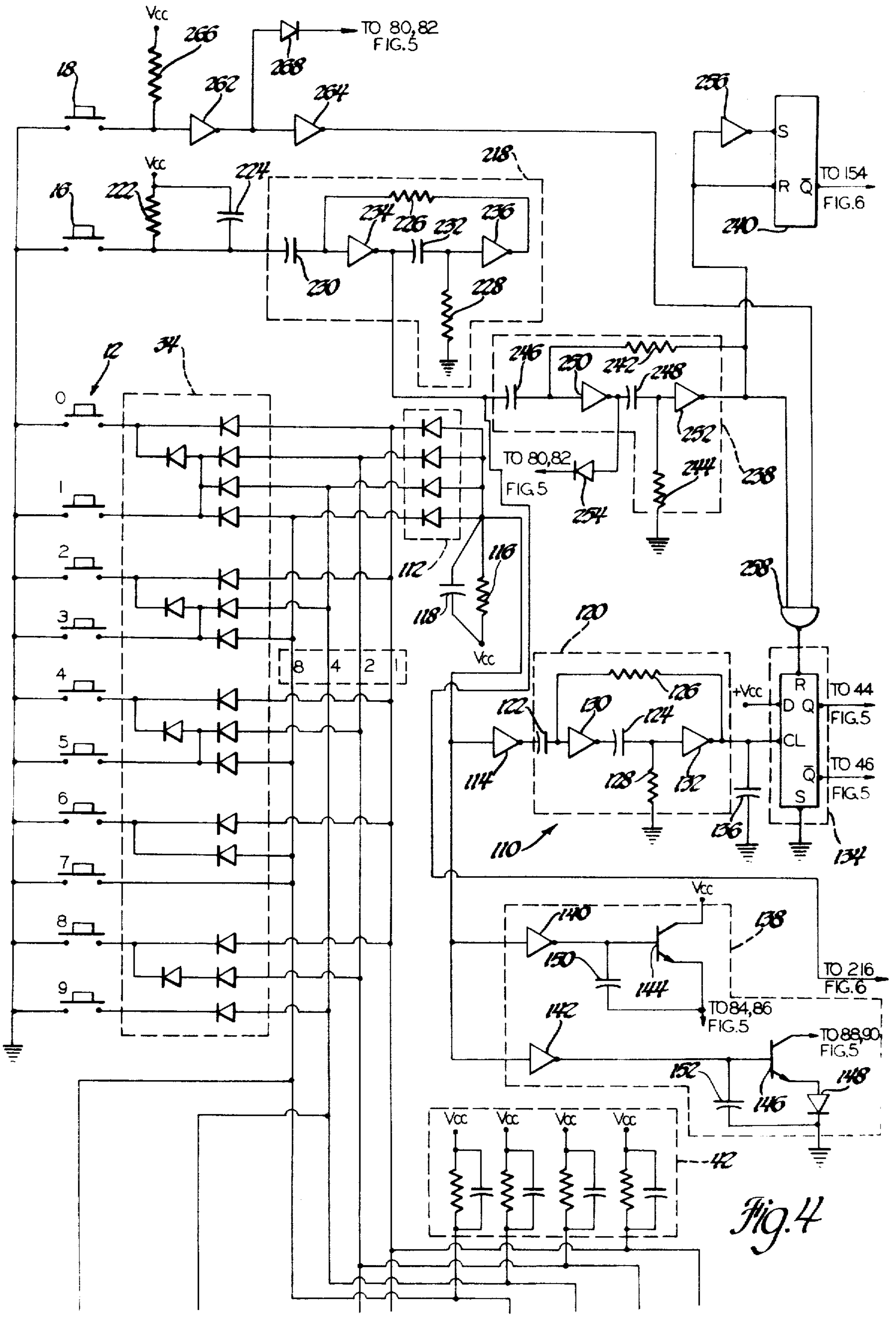

Referring now to the drawings and initially to FIG. 1, the memory keyboard unit of the present invention is generally designated 10 and is provided with a plurality of pushbuttons generally designated 12 associated with the numerals 0–9. The unit 10 further includes a two-digit display 14 and is provided with STORE and ERASE pushbuttons generally designated 16 and 18 and an ACCEPT lamp 20. At the side of the unit a phone jack generally designated 22 is provided for connection with a non-shorting phone plug 24 attached to a cable 26. The cable 26 is supported at an assembly line location designated 28 and extends from the location 28 to a computer generally designated 30 which is interconnected with an output unit such as a CRT display 32.

Eight two digit decimal numbers may be entered into the unit 10 by an on-line inspector. A ninth two digit number is hard wired in the memory of the unit 10 to provide an operator identification number. Data is entered via the keyboard 12 by depressing a pushbutton which corresponds to the first digit of the numeric code (0–99) for a particular item noted by the inspector. Depressing the first pushbutton displays the number in the tens portion of the display 14. The second pushbutton depression displays the number corresponding to the pushbutton depressed in the units portion of the display 14, while also displaying the previously entered number in the tens portion of the display 14. The display 14 remains on as long as a pushbutton is depressed and is extinguished upon release as the pushbutton. If the operator is not satisfied with the code number displayed he may depress the ERASE pushbutton 18 and thereafter enter the proper code number. If the operator is satisfied with the code displayed he may depress the STORE pushbutton 16 to store the code number previously displayed into a particular location in memory. Each time the STORE pushbutton is depressed, the code number being stored is placed in the next sequential memory location. When the memory keyboard unit 10 is connected with the cable 26 the data stored in the keyboards memory is transmitted to the computer 30 for display on the CRT display 32 which may be viewed by supervisory personnel on the assembly line.

Figure 5:
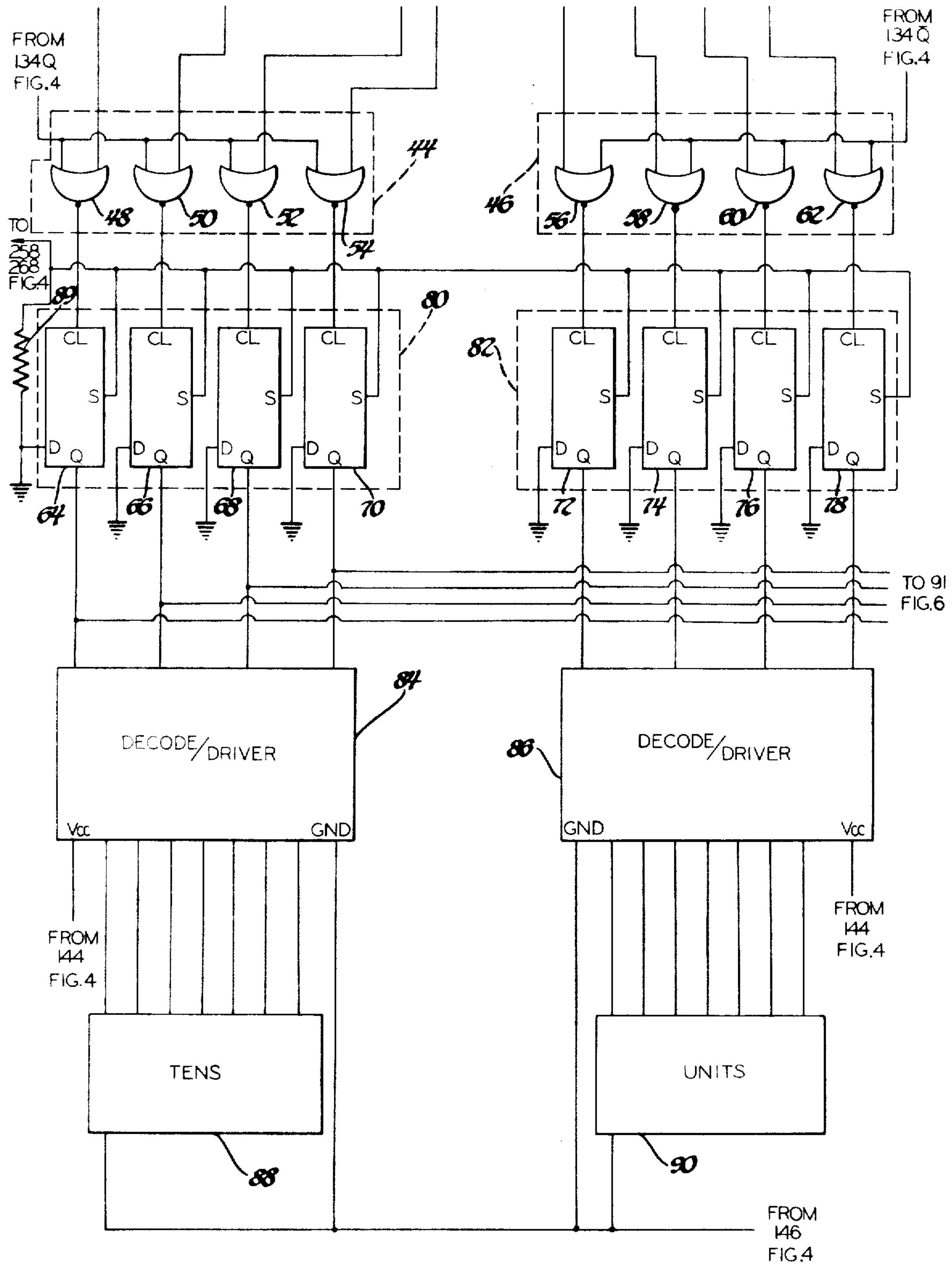
Figure 6:
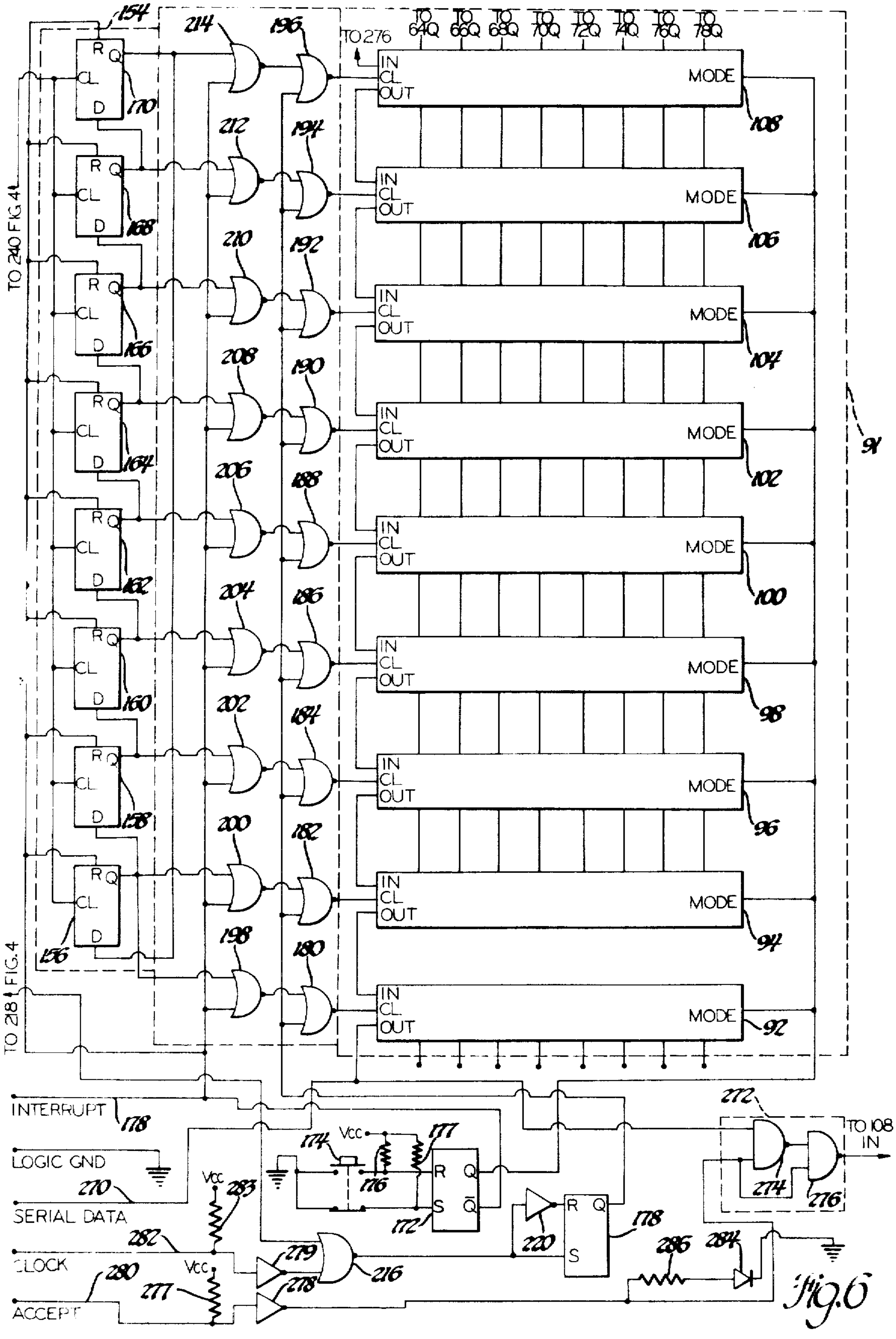

Referring now to FIGS. 4, 5 and 6, a schematic diagram of the memory keyboard unit 10 is shown. The individual pushbuttons associated with the numbers 0–9 each have one side grounded while the other side is connected with $V_{cc}$ through encoding circuitry generally designated 34 and pull-up circuitry 42. Each of the pull-up resistors in the circuitry 42 is shunted by a filter capacitor to reduce noise from contact bounce. The encoding circuitry 34 comprises a plurality of diodes interconnecting each of the pushbutton switches 12 with steering gates generally designated 44 and 46 (FIG. 5) respectively through the BCD lines designated 8, 4, 2 and 1. The steering gates 44 comprise NOR gates 48 through 54 while the steering gate 46 comprises NOR gates 56 through 62. Encoding is accomplished by switching the input to certain of the gates 48 through 62 from a logic "1" established by the circuitry 42 to a logic "0". For example, binary coding of the digit 2 is accomplished by switching the inputs to the gates 48, 50, 54 and 56, 58 and 62 from a logic "1" to a logic "0". By utilizing this reverse logic encoding current drain is minimized since passive components can be used to pull up a logic gate input to a logic "1".

The output of the gates 48 through 62 are connected with the clock input of respective D type flip-flops 64 through 78. The flip-flops 64 through 70 form a tens buffer generally designated 80 while the flip-flops 72 through 78 form a units buffer generally designated 82. The outputs of the tens buffer 80 and the units buffer 82 are respectively fed to decode-drivers 84 and 86. The decode-drivers 84 and 86 are connected with a seven segment tens display 88 and a seven segment units display 90 respectively. The decode-drivers 84 and 86 are conventional units such as the Monsanto MSD 101. The display units 88 and 90 are also conventional units such as the Monsanto MAN 3.

The flip-flop 64 through 78 have their D inputs connected directly to ground while the set inputs are connected to ground through a resistor 89. The Q output of the flip-flop 64 through 78 are set to a logic "1" prior to data entry via the pushbuttons 12 providing logic "1's" at each input of the decode-drivers 84 and 86 which is interpreted as a blank. This blank input can be easily interpreted as no information by the computer after transfer of data and is useful in diagnosing problems with the memory keyboard.

Entry of the data into the tens buffer 80 and units buffer 82 is under the control of a steering gate control circuit generally designated 110 (FIG. 4) which is connected with the pushbutton switches 12 through diodes 112 which form an OR circuit. The steering gate control circuitry 110 includes an inverter 114 having its input connected with $V_{cc}$ through a pull-up resistor 116. A shunt capacitor 118 is provided to reduce noise due to contact bounce. The output of the inverter 114 is connected with a single shot multivibrator 120. The multivibrator 120 comprises capacitors 122 and 124, resistors 126 and 128, and inverters 130 and 132. The output of the multivibrator 120 is connected with the clock input of a D type flip-flop 134 having its D input connected to $V_{cc}$, its set input grounded and its Q and $\overline{Q}$ outputs connected with the steering gates 44 and 46 respectively. A capacitor 136 connects the clock input of the flip-flop 134 to ground to eliminate pulse triggering of the flip-flop 134 due to power supply fluctuations. The output of the inverter 132 is normally high due to its input being grounded through resistor 128. The output of the inverter 114 is normally low due to its input being connected to $V_{cc}$. The capacitor 122 is thus charged through the resistor 126. Upon actuation of any of the pushbuttons 12 the output of the inverter 114 goes high discharging the capacitor 122. Upon deactuation of the pushbutton the output of inverters 114 and 132 go low. The output of the inverter 132 remains low for a time interval determined by the time constants of the capacitors 122 and 124 and the resistors 126 and 128. When the output of inverter 132 reverts high the flip-flop 134 is clocked to place a high at the Q output and a low at the $\overline{Q}$ output thereby closing the gates 44 and opening the gates 46. The time delay between release of a pushbutton and switching of the flip-flop 134 insures that the data has been stored in the memory buffer 80 or 82 before the flip-flop 134 changes state. The delay also prevents noise from the displays 88 and 90 from affecting the state of the flip-flop 134.

The power to the decode-drivers 84 and 86 and the display units 88 and 90 is controlled from a power switching unit generally designated 138. Power is applied only during the interval that the pushbuttons 12 are depressed to prolong battery life. The switching unit 138 comprises inverters 140 and 142 having their inputs connected to the pushbuttons 12 and to $V_{cc}$ through the resistor 116 and their outputs connected to the base electrodes of transistors 144 and 146. The collector electrode of transistor 144 is connected to $V_{cc}$ while the emitter is connected with the power input to each of the decode-drivers 84 and 86. The emitter-collector electrodes of transistor 146 connect the display units 88 and 90 to ground through a voltage dropping diode 148. The emitter-base electrodes of the transistors 144 and 146 are coupled through respective filter capacitors 150 and 152.

The outputs of the memory buffers 80 and 82 are also connected as inputs to a memory unit generally designated 91 (FIG. 6). The memory unit 91 comprises nine 8 bit universal shift registers 92 through 108. The eight inputs to the shift register 92 may be connected to $V_{cc}$ or ground so that the register 92 is permanently wired with a code word for identifying the particular keyboard unit. The registers 94 through 108 are each connected to the buffers 80 and 82 as shown and storage of data in a particular one of the shift registers 94 through 108 is under the control of a program counter 154. The counter 154 comprising D type flip-flops 156 through 170. Each flip-flop has its Q output terminal connected with the D input terminal of the following flip-flop. The counter 154 is placed in its initial condition from a mode control flip-flop 172 which has its $\overline{Q}$ output connected with the set input of the flip-flop 156 and with the reset input of the flip-flops 158 through 170. The flip-flop 172 is reset causing its Q output to go low and its $\overline{Q}$ output to go high in response to connection of the keyboard unit with the computer by a switch generally designated 174 which grounds the set input of the flip-flop 172 and applies $V_{cc}$ to the reset input through a resistor 176. Upon disconnection of the keyboard unit from the computer the switch 174 grounds the reset input of the flip-flop 172 and applies $V_{cc}$ to the set input through a resistor 177 which switches the Q output high and the $\overline{Q}$ output low. When the $\overline{Q}$ output goes high upon connection of the unit with the computer the flip-flop 156 is set causing its Q output to go high while the flip-flops 158 through 170 are reset causing their Q outputs to go low. An INTERRUPT line 179 is connected with the $\overline{Q}$ output of the flip-flop 172 to inform the computer of connection and disconnection of the keyboard unit therewith. The registers 92 through 108 are clocked from a clock flip-flop 178 through respective NOR gates 180 through 196. The Q output of flip-flop 178 is connected as one input to each oF the NOR gates 180 through 196 while the outputs of the gates 180 through 196 are connected with the clock inputs of the respective registers 92 through 108. The other input to the gates 180 through 196 is from the output of NOR gates 198 through 214 respectively. One input to each of the gates 198 through 214 is from the $\overline{Q}$ output of the mode control flip-flop 172 while the other inputs to the gates 198 through 204 is from the Q outputs of the respective flip-flops 156 through 170.

Data stored in the tens buffer 80 and units buffer 78 is shifted into the flip-flops 94 through 108 under the control of the STORE pushbutton 16. A NOR gate 216 has its output connected to the set input of the flip-flop 178 and through an inverter 220 to the reset input of the flip-flop 178. One input to the gate 216 is from the STORE pushbutton 16 through a conventional one shot multivibrator 218 (FIG. 4). One side of the pushbutton 16 is grounded while the other is connected to $V_{cc}$ through a pull-up resistor 222 and a capacitor 224. The one shot multivibrator 218 comprises resistors 226 and 228, capacitors 230 and 232 and inverters 234 and 236. The output of the multivibrator 218 is connected with the input of a conventional one-shot multivibrator 238 which has its output connected with the clock inputs of each of the flip-flops 156 through 170 in the program counter 154 through a flip-flop 240. The one-shot multivibrator 238 comprises resistors 242 and 244, capacitors 246 and 248, and inverters 250 and 252. The output of the inverter 250 is connected to the set inputs of the flip-flops in the tens buffer 80 and the units buffer 78 through a diode 254. The output of the inverter 252 is connected directly to the reset input of the flip-flop 240 and through an inverter 256 to the set input of the flip-flop 240. The output of the inverter 252 is also connected to the reset input of the steering flip-flop 134 through a NAND gate 258. The other input to the NAND gate 258 is from the ERASE pushbutton 18 through inverters 262 and 264. The low side of the ERASE pushbutton 260 is grounded while the high side is connected to $V_{cc}$ through a resistor 266. The output of the inverter 262 is connected with the set inputs of the flip-flops in the tens buffer 80 and units buffer 78 through a diode 268.

As previously mentioned when the keyboard unit is connected with the computer the mode control flip-flop 172 is reset causing its Q output to go low. The Q output of flip-flop 172 (FIG. 6) is connected with the mode input of each of the registers 92 through 108 and switches these registers from a parallel input to a serial output mode. The input to each of the registers 92 through 108 is connected with the output of the following register so that the serial output data is first shifted out of the identification register 92 followed by the data stored in registers 94 through 108. The output of the register 92 is connected to a SERIAL DATA line 270 for transferring data to the computer and is also connected with a wrap around circuit 272 comprising NAND gates 274 and 276. The other input to the NAND gate 274 is connected to $V_{cc}$ through a pull-up resistor 276 and an inverter 278. The input to the inverter 278 is also connected with an ACCEPT line 280 connected with the computer. The output of the wrap around circuit 272 is connected with the input of the register 108. The data stored in the registers 92 through 108 is shifted out serially under the control of the clock in the computer which is connected with the clock flip-flop 178 through the gate 216 and an inverter 279. The inverter 279 has its input connected with the conductor 282 designated CLOCK input and also connected with the $V_{cc}$ through a pull-up resistor 283.

A light emitting diode 284 is connected between ground and the output of the inverter 278 through a resistor 286. The light emitting diode 284 provides an indication to the operator of the memory keyboard whether the data transmitted has been accepted by the computer. When the ACCEPT line 280 goes low the wrap around circuit 272 is enabled as is the circuit to the light emitting diode 284. However, since the serial data will be transmitted is at a CLOCK rate of approximately 10 kilohertz the duration of transmission of the data is very short so that the light from the diode 284 is not perceived during the time of data transmission. Subsequent to the redundant transmission of the data from the memory keyboard for comparison purposes, the ACCEPT line is switched high so that a low input is provided to the gates 274 and 276 producing a high output from the wrap around circuit 272 which causes logic "1's" to be loaded into the registers 94 through 108. If the computer verifies the data as accurate the ACCEPT line 280 goes low and remains low and light is emitted from the diode 284. If the data is inaccurate the ACCEPT line 280 is alternately switched high and low at approximately one-fourth second intervals by the computer to provide a flashing indication to the operator that the data was not accepted and should be reentered.

Referring now to FIG. 2, the construction of the phone plug 24, which is wired to the computer interface, is shown in greater detail and comprises a pair of prongs generally designated 294 and 296. The prong 294 includes a DATA contact area 298, an INTERRUPT contact area 300 and a GROUND contact area 302. The prong 296 has a CLOCK contact area 304, a DATA ACCEPT contact area 306 and a SPARE contact area 308. The contact areas 298, 300 and 302 engage respective contact areas 310, 312 and 314 in the phone jack 22 while the areas 304, 306 and 308 respectively engage contact areas 316, 318 and 320 in the phone jack 22. The last connection made during plug-in is the INTERRUPT signal while the first connection is DATA and CLOCK to insure a good plug-in before data transmission.

The operation of the memory keyboard is as follows. With the memory keyboard disconnected from the computer the mode control flip-flop 172 is set so that its Q output is high placing the registers 92 through 108 in their parallel input mode of operation. The program counter 154 has previously been set so that the Q output of flip-flop 156 is high and the Q output of the flip-flops 158 through 170 are low. The $\overline{Q}$ output of the mode flip-flop 172 is low so that the outputs of gates 202 through 214 are high holding the output of gates 184 through 196 low. The output of gates 198 and 200 are low so that one input to each of the gates 180 and 182 is low opening these gates. The flip-flop 134 is initially reset to a condition where the Q output is low and the $\bar{Q}$ output is high thereby opening the steering gates 44 and closing the steering gates 46. Consequently, actuation of one of the pushbuttons 12 causes certain of the flip-flops 64 through 70 in the tens buffer 80 to be clocked to provide the binary representation of the data at the input to the decode-driver 84. Actuation of the pushbutton renders the transistors 144 and 146 conductive energizing the decode-drivers 84 and 86 and the display units 88 and 90 so that the number represented by the actuation of the pushbutton is displayed in the tens position. Since all "1's" are provided at the input to the decode-driver 86 a blank appears, i.e., no number appears in the units display 90. A short interval of time, as determined by the multivibrator 120, after the pushbutton is deactuated the flip-flop 134 is clocked so that the number represented by the next actuation of a pushbutton is fed to the units buffer 82 to provide the binary representation to the decode-driver 86. Upon depression of the pushbutton both the previous number and the number presently being entered is displayed on the tens buffer 88 and the unlts buffer 90 respectively. The operator may view the display to determine that he has correctly entered the desired code. If the code entry is incorrect he may press the ERASE button 18 which sets all flip-flops in the tens buffer 80 and the units buffer 82 to a logic "1" output and at the same time resets the steering flip-flop 134 so that the steering gates 44 are opened and the steering gates 46 are closed. If the operator determines that the code has been entered correctly the code is stored in the memory 91 by depression of the STORE pushbutton 16 which immediately provides a logic "1" to the gate 216 causing its output to go low, resetting the clock flip-flop 178 so that its Q output is low. Accordingly, both inputs to the gates 180 and and 182 are low and the registers 92 and 94 are clocked from the outputs of the gates 180 and 182 thereby entering the identification code number into the register 92 and the coded number stored in the tens buffer 80 and units buffer 82 into the register 94. After a time interval determined by the multivibrator 218 the output of the inverter 234 reverts to a low and the output of the inverter 250 in the multivibrator 238 goes high to set the flip-flops in the tens buffer 80 and the units buffer 82 to a logic "1" output. At the same time the output of the inverter 252 in the multivibrator 238 goes low resetting the steering flip-flop 134 and setting the flip-flop 240. After a time interval determined by the multivibrator 238 the output of the inverter 252 goes high resetting the flip-flop 240 and clocking the program counter 254 so that a logic "1" appears at the Q output of the flip-flop 158 and a logic "0" appears at the Q output of the flip-flops 156 and 160 through 170 thereby opening the gate 184 and closing the gates 180, 182 and 186 through 196. Accordingly, the first pushbutton actuated after actuation of the STORE pushbutton 16 causes the data to be entered into the tens buffer 80 and displayed on the tens display 88. By displaying the first digit in the tens display 88 and a blank in the units display 90 when only a single digit code number is entered a two digit number such as 24 is automatically displayed to the operator as 24 without the necessity for shifting data between the buffer units 80 and 82. After entry of the data into the buffer units 80 and 82 actuation of the STORE pushbutton 16 will store the data in the register 96. Subsequent data is stored in the registers 98 through 108 in the manner described with reference to storage of data in the registers 94 and 96.

When the operator decides to transmit the data to the computer the phone plug 24 which is wired to the computer interface is inserted into the phone jack 22. This causes the mode control flip-flop 172 to be reset switching its Q output low thereby placing the registers 92 through 108 in their serial output mode of operation and switching the $\bar{Q}$ output high thereby establishing the initial condition of the program counter 154 and providing a high on the INTERRUPT line to signal the computer to initiate the serial transmission of data. Furthermore, when the $\bar{Q}$ output of the mode control flip-flop 172 goes high the output of all of the gates 198 through 204 goes low thereby opening all of the gates 180 to 196 so that the clock pulses on the CLOCK line 282 clock each of the registers 92 through 108. The computer is programmed to respond to a high on the INTERRUPT line to initiate clock pulses on the CLOCK line 282 and to place the ACCEPT line 280 low to initiate wrap around of data in the memory shift registers 92 through 108. After two transmissions of the data to the computer for comparison purposes the ACCEPT line 280 reverts to high so that the input to the gate 274 and 276 from the ACCEPT line 280 goes low causing the output of the gate 276 to go high. Since the output of the gate 276 is tied to the input of the register 108 all logic "1's" are stored in the registers 92 through 108 and thereafter the clock input at the line 282 stays high to terminate serial transmission of data. At this time a low level signal is applied to the ACCEPT line 280 to illuminate the light emitting diode 284 to indicate that the data has been accepted by the computer or an alternate high and low signal is applied to the ACCEPT line to cause a flashing light output from the diode 284 if the data, upon comparison, is found to have been inaccurately transmitted.

Having thus described my invention what I claim is:

1. A portable self-contained memory keyboard unit for temporarily storing data for subsequent transfer to a computer comprising a plurality of individual operator actuable data switch means and store switch means, display means including a tens display and a units display, display control means responsive to operation of said data switch means for displaying in said time display the data represented by actuation of the first data switch means subsequent to actuation of the store switch means and for displaying the data represented by actuation of the first and second data switch means subsequent to actuation of said store switch means in said tens display and said units display respectively, power switching means for respectively energizing and deenergizing said display means in response to respective actuation and deactuation of any of said data switch means, memory means including a plurality of shift registers, mode control means normally establishing a parallel data input mode of operation of said memory means and responsive to connection of said device with said computer for establishing a serial data output mode, memory control means responsive to each actuation of said store switch means for entering the data previously displayed on said display means into one of said plurality of shift registers upon actuation of said store switch means, said memory control means including program counter means resettable from said mode control means and responsive to actuation of said store switch means for programming entry of data into successive ones of said plurality of shift registers in response to successive actuations of said store switch means.

2. A portable self-contained memory keyboard unit for temporarily storing data for subsequent transfer to a computer comprising a plurality of individual operator actuable data switch means and store switch means, display means including a tens display and a units display, display control means responsive to operation of said data switch means for displaying in said time display the data represented by actuation of the first data switch means subsequent to actuation of the store switch means and for displaying the data represented by actuation of the first and second data switch means subsequent to actuation of said store switch means in said tens display and said units display respectively, power switching means for respectively energizing and deenergizing said display means in response to respective actuation and deactuation of any of said data switch means, memory means including a plurality of shift registers, mode control means normally establishing a parallel data input mode of operation of said memory means and responsive to connection of said device with said computer for establishing a serial data output mode, memory control means responsive to each actuation of said store switch means for entering the data previously displayed on said display means into one of said plurality of shift registers upon actuation of said store switch means, said memory control means including program counter means resettable from said mode control means and responsive to actuation of said store switch means for programming entry of data into successive ones of said plurality of shift registers in response to successive actuations of said store switch means, means responsive to connection of said keyboard unit to said computer for connecting the serial output of said first of said plurality of shift registers to the serial input of the last of said plurality of said shift registers to permit the data stored in said memory means to be transmitted to said computer under computer control and to permit comparison and verification of the data, and indicating means energizable from said computer for indicating verification of the data.

3. A portable self-contained memory keyboard unit for storing data for subsequent transfer to computer comprising:

a plurality of individually operable actuable data switch means, means connected with said data switch means for encoding the data represented by actuation of any of said data switch means, memory buffer means including a tens buffer and a units buffer, said memory buffer means having a set condition establishing a logic "1" output level, first and second steering gate means interconnecting said encoding means with said tens and units buffers respectively, display means, decode-driver means interconnecting said memory buffer means and said display means, power switching means for respectively energizing and deenergizing said decode-driver means and said display means in response to respective actuation and deactuation of any of said data switch means, steering control means having a reset condition opening said first steering gate means and closing said second steering gate means and responsive to operation of said data switch means for closing said first steering gate means and opening said second steering gate means a predetermined interval of time after deactuation of said data switch means, memory means including a plurality of shift registers capable of operating in a parallel data input mode and a serial data output mode, mode control means normally establishing said parallel data input mode and responsive to connection of said keyboard unit with said computer for establishing said serial data output mode, an operator actuable store switch means, memory control means responsive to actuation of said store switch means for entering a code word into a first of said plurality of shift registers and for entering the data contained in said memory buffer means at the tine of actuation of said store switch means into a second of said plurality of shift registers, means for setting said memory buffer means a predetermined interval of time after data entry and for resetting said steering control means a predetermined interval of time after setting of said memory buffer means, said memory control means including program counter means resettable from said mode control means upon connection of said keyboard unit with said computer, said program counter means being responsive to actuation of said store switch means for programming entry of data into successive ones of said plurality of said shift registers in response to successive actuations of said store switch means, means responsive to connection of said keyboard unit to said computer for connecting the serial output of said first of said plurality of shift register to the serial input of the last of said plurality of said shift registers to permit the data stored in said memory means to be transmitted to said computer under computer control and to permit comparison and verification of the data, and indicating means energizable from said computer for indicating verification of the data.

* * * * *